United States Patent
Ganter

[11] Patent Number: 6,038,262
[45] Date of Patent: Mar. 14, 2000

[54] METHOD AND APPARATUS FOR COMPENSATION OF ELECTRO-MAGNETIC DISTORTION USING WEIGHTED FEEDBACK DELAY FOR AMPLITUDE CODED SINUSOIDAL WAVEFORM GENERATION AND TRANSMISSION

[75] Inventor: William A. Ganter, Boulder, Colo.

[73] Assignee: Transcendata, Inc., Boulder, Colo.

[21] Appl. No.: 09/093,751

[22] Filed: Jun. 9, 1998

[51] Int. Cl.[7] ........................................... H04K 1/10
[52] U.S. Cl. ...................... 375/296; 455/114; 375/260
[58] Field of Search .................... 455/103, 110, 455/114; 375/285, 296, 260, 316, 383, 386; 341/144

[56] References Cited

U.S. PATENT DOCUMENTS

| | | |
|---|---|---|
| 3,787,836 | 1/1974 | Hagelbarger . |
| 3,941,942 | 3/1976 | Nash . |
| 4,091,243 | 5/1978 | Mizrahi et al. . |
| 4,142,184 | 2/1979 | Lake . |
| 4,333,150 | 6/1982 | Matty et al. . |
| 4,349,704 | 9/1982 | Gillis . |
| 4,425,666 | 1/1984 | Groth, Jr. . |
| 4,563,548 | 1/1986 | Misherghi et al. . |
| 4,601,045 | 7/1986 | Lubarsky . |
| 4,639,554 | 1/1987 | Masuda et al. . |
| 4,680,777 | 7/1987 | Saha . |
| 4,726,040 | 2/1988 | Acampora . |
| 4,727,570 | 2/1988 | Tarbouriech . |
| 4,878,236 | 10/1989 | Ray et al. . |
| 5,063,574 | 11/1991 | Moose . |
| 5,335,250 | 8/1994 | Dent et al. . |
| 5,402,449 | 3/1995 | Schultes et al. . |
| 5,425,053 | 6/1995 | Matsumoto . |
| 5,481,389 | 1/1996 | Pidgeon et al. ........................ 375/296 |
| 5,499,270 | 3/1996 | Popovici et al. . |
| 5,557,645 | 9/1996 | Dent . |
| 5,588,053 | 12/1996 | Xie . |
| 5,659,606 | 8/1997 | Druilhe . |
| 5,758,268 | 5/1998 | Murakami et al. ..................... 375/296 |
| 5,778,029 | 7/1998 | Kaufmann ............................... 375/296 |
| 5,802,112 | 9/1998 | Ganter . |
| 5,818,813 | 10/1998 | Saito et al. ............................. 375/260 |
| 5,917,373 | 6/1999 | Twitchell ................................ 375/296 |

*Primary Examiner*—Dwayne D. Bost
*Assistant Examiner*—Nay A. Maung
*Attorney, Agent, or Firm*—Frommer Lawrence & Haug LLP; William S. Frommer; Gordon Kessler

[57] ABSTRACT

An apparatus and method of compensating for systematic electro-magnetic distortions of generated and transmitted amplitude coded sinusoidal waveforms, where the distortions arise from the varying rate of change of these waveforms. An analog waveform is formed as an interference pattern generated by the combination of at least three substantially sinusoidal waves and represents input data which is divided into N-bit data segments, where N is an integer greater than one. Each of the substantially sinusoidal waves has at least one controllable wave characteristic which is controlled as a function of an N-bit data segment. The analog waveform is delayed through each of at least two delay paths having respective time intervals and respective weightings associated with each of the at least two delay paths are determined. A weighted delayed analog signal is generated at each delay path by multiplying each of the delayed analog signals by the weighting associated with that delay path. The weighted delayed analog signals from each of the delay paths are then combined to generate a compensated analog waveform to correct for electro-magnetic distortion in the analog waveform.

72 Claims, 8 Drawing Sheets

METHOD AND APPARATUS FOR COMPENSATION OF ELECTRO-MAGNETIC DISTORTION USING WEIGHTED FEEDBACK DELAY FOR AMPLITUDE CODED SINUSOIDAL WAVEFORM GENERATION AND TRANSMISSION

BACKGROUND OF THE INVENTION

This invention relates generally to an electric signal generation and transmission apparatus and method, and more particularly to an electrical signal compensation apparatus and method which compensates for distortion of an electric signal due to the varying rate of change of the signal.

Electrical signals are affected by physical conditions during transmission. The affect on the transmitted signal is dependent on a number of factors, including the frequency of the transmitted electrical signal and the transmission distance of the electrical signal. For example, a rectangular pulse will become more rounded by the low pass filter effect of a transmission wire as the frequency of the rectangular pulse increases. Digital pulse codes having spacing intervals of integer multiples of T between voltage transitions (where T is time) are attenuated more in the higher frequencies (closely spaced transitions having shorter times between transitions, such as 1T, by way of example) than in the lower frequencies (less closely spaced transitions having longer times between transitions, such as a multiple of T, by way of example).

These effects on a transmitted electrical signal are a result of the physics of the transmission system, and are therefore systematic. An electrical signal is subjected to electro-magnetic distortion during high-speed generation, during propagation within the wire, when passing through any transition position between elements in the electrical transmission system, when being coupled, for example, by an opto-electrical converting device, when being passed through a bandpass filter, or when being stored on a magnetic medium. For example, any number of specific circuits are required for launching of the electrical signal. Additionally, during generation of the signal, further signal processing generally is required to provide impedance matching to suppress reflections during transmission, for coupling and gain control for reception, for equalization to compensate for frequency dependent attenuation of the electrical signal and for smoothing the signal. Each of these signal processing circuits may imposes some degree of electro-magnetic transient distortion on the electrical signal due to the varying rate of change of the signal. Additionally, since a wire transmission line also acts as a circuit, the transmission wire itself introduces electro-magnetic distortion into the waveform.

Since these circuits form at least a part of each and every transmission of an electrical signal from a particular transmission apparatus, the affects thereof are repeatable on similar frequency signals transmitted through a similar transmission apparatus over a similar transmission distance. These affects become greater as the frequency of the electrical signal increases and as the transmission distance of the electrical signal increases. These affects may result in signals which have fast rise and fall times and a wide frequency bandwidth overshooting the desired voltage levels, resulting in ringing, or other distortions. The removal of these distortions requires additional signal processing, which may then generate further electrical distortion.

Therefore, it would be beneficial to provide an apparatus for generating and transmitting an electrical signal which can compensate for rather than suffer from the electro-magnetic transient distortion of prior art generation and transmission systems.

OBJECTS OF THE INVENTION

Accordingly, it is an object of the invention to provide an improved electric signal generation and transmission apparatus.

Another object of the invention is to provide an improved signal generation and transmission apparatus which compensates for electro-magnetic distortion in a transmitted electrical signal.

A further object of the invention is to provide an improved signal generation and transmission apparatus which compensates for systematic electro-magnetic distortion generated in the apparatus.

Yet another object of the invention is to provide an improved generation and signal transmission apparatus which compensates for electro-magnetic distortion generated as a result of propagation distance of the electrical signal in a transmission wire.

Another object of the invention is to provide an improved signal generation and transmission apparatus which compensates for the electro-magnetic distortion effect of high frequency waveform generation.

A still further object of the invention is to provide an improved electric signal generation and transmission apparatus which utilizes delayed feedback loops to compensate for electro-magnetic distortion generated thereby.

An additional object of the invention is to provide an improved signal generation and transmission apparatus which utilizes delayed feedback loops to adjust very high frequency amplitude coded sinusoidal analog waveforms to closely conform to their desired shape upon receipt.

A further object of the invention is to provide an improved signal generation and transmission apparatus which precompensates generated waveforms for the distortion that will be encountered during transmission.

Still other objects and advantages will in part be obvious and will in part be apparent from the specification and drawings.

SUMMARY OF THE INVENTION

Generally speaking, in accordance with the invention, an electric signal compensation apparatus and method are provided for determining and compensating for the electro-magnetic distortion of an electrical signal produced as a result of generation and control circuits within the transmission apparatus, and as a result of attenuation and other physical factors during transmission of the electrical signal through a transmission medium. In accordance with the invention, a sinusoidal analog waveform is generated with a varying amplitude in order to encode various digital data. This sinusoidal analog waveform may be formed in accordance with the method as set forth in U.S. patent application Ser. No. 08/773,527, by way of example, the complete contents of which are incorporated herein by reference, or by any other method which allows digital data to be encoded in a varying amplitude sinusoidal AC analog waveform. This sinusoidal analog waveform is formed as an interference pattern generated by the combination of at least three substantially sinusoidal waves, the analog waveform representing input data which is divided into N-bit data segments, where N is an integer greater than one, each of the substantially sinusoidal waves having at least one controllable wave characteristic which is controlled as a function of an N-bit data segment. Further in accordance with the invention, the generated analog sinusoidal waveform that can be compensated by the method and apparatus of the present invention has a fundamental frequency of F=½T Hz. The varying amplitude characteristic of the sinusoidal analog waveform presents a rate of change different from that of a constant amplitude sinusoidal waveform of frequency F. This varying rate of change allows for the encoding of digital information by the varying amplitude sinusoidal analog waveform.

As noted above, this generated sinusoidal analog waveform encounters electrical distortion during high frequency generation and generated by the electrical transmission apparatus and by the transmission of the waveform along a transmission medium. This distortion is greater at higher frequencies, and therefore disrupts higher data transfer rates. In accordance with the invention the various electromagnetic distortions that arise from the varying rate of change of the sinusoidal waveform within the transmission system and transmission medium are nearly completely reversed or canceled so that the coded sinusoidal analog waveform closely conforms to its intended sinusoidal shape when it is received and is decoded.

In accordance with the invention, a coded analog sinusoidal waveform having zero crossing points at each time T is provided. At least one feedback loop is provided which is delayed by an integer multiple of T, and which is associated with a respective weighting or gain. By delaying the coded analog sinusoidal waveform through the at least one feedback loop, and by appropriately selecting the respective weightings, the signals from the at least one feedback loop can be combined with the original coded sinusoidal analog waveform in the appropriate amounts in order to precompensate for any distortion which arises from the generation or transmission of the signal. The signal received after transmission without weighting is compared with the transmitted signal. Then various weighting and delay schemes are tested to determine which combination of delay and weighting will result in the most accurate transmission of the coded sinusoidal analog waveform. In accordance with the invention, the received signal is therefore restored to its intended sinusoidal shape.

In accordance with the invention, a method and apparatus are provided to measure, by A/D sampling, a generated or a received sinusoidal analog waveform and to select the integer multiple of T delay feedback paths to be used, and to compute amplitude weightings for these selected delayed feedback paths.

By way of example, a sinusoidal analog waveform having a continuously varying amplitude v(t) is divided into at least three paths. A first path, which is considered to be positioned in time one T prior to the received analog waveform, called a first order lead, is attenuated by a weighting w0. A first delayed path, which is positioned even in time with the received analog waveform, is delayed by 1T relative to the first path and is attenuated by a weighting w1. A second delay path, which is positioned in time one T after the received analog waveform, called a first order lag, is delayed by 2T relative to the first delayed path and is attenuated by a weighting w2, where w0+w1+w2=1. The output from the three paths are combined to form the adjusted waveform with amplitude a(t). Typically, the w1 weighting of the 1T delay path is much greater than either the w0 weighting of the lead path or the w2 weighting of the 2T lag delay path. The weighting of each of the delay paths is determined by a converging iterative process by varying the weightings and comparing the adjusted analog waveform to its intended sinusoidal shape. The expression for the combination of the waves in this example is a(t−T)=−w0*v(t)+w1*v(t−T)−w2*v(t−2T). It is also possible to provide higher order lead and lag delay paths in order to better adjust the analog sinusoidal waveform to account for its distortions.

In accordance with the invention, very high speed waveform generation and both high speed and long distance waveform transmission are possible. The delaying technique of the invention enables integrating voltage level detection of an amplitude coded sinusoidal waveform in each positive or negative lobe, of duration T, of the waveform.

The invention accordingly comprises the several steps and the relation of one or more of such steps with respect to each of the others, and the apparatus embodying features of construction, combinations of elements and arrangements of parts which are adapted to effect such steps, all as exemplified in the following detailed disclosure, and the scope of the invention will be indicated in the claims.

BRIEF DESCRIPTION OF THE DRAWINGS

For a more complete understanding of the invention, reference is made to the following description and accompanying drawings, in which.

DETAILED DESCRIPTION OF THE PREFERRED EMBODIMENTS

Figure 1:
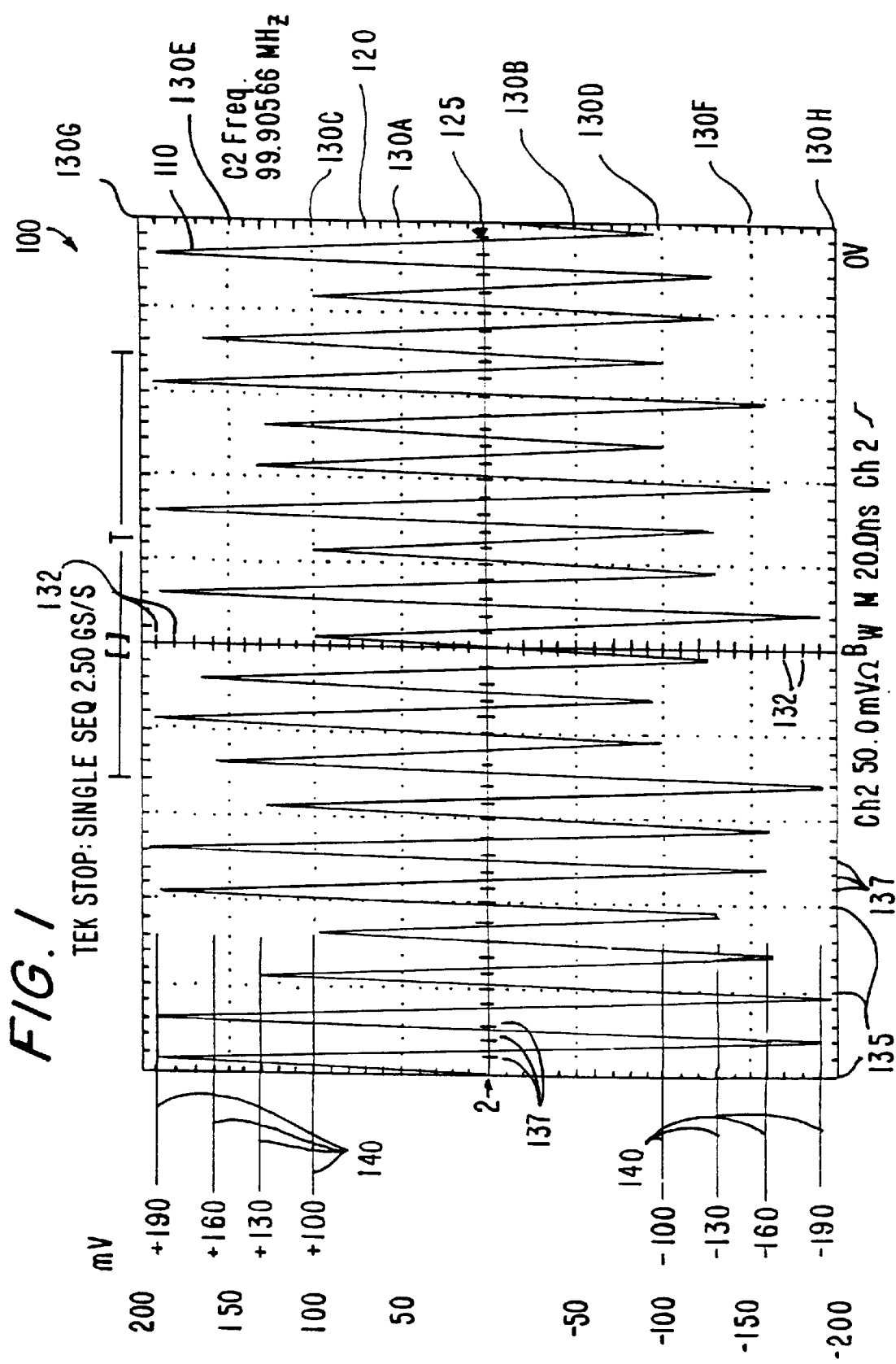
FIG. 1 depicts a graphical representation of an A/D sampling of an AC sinusoidal analog waveform having a frequency F=100 MHz and a T of 5 nsec, and coding 400 Mbps.

Reference is first made to FIG. 1, which depicts a view of an analog sinusoidal waveform display, indicated generally at 100. A received analog sinusoidal waveform 110 is displayed on a display 120. An origin amplitude line 125 is shown, and amplitude crosshatches 130A–130H and interval amplitude measurements 132 are also provided. Finally, timing crosshatches 135 and interval timing measurements 137 are provided along origin amplitude line 125.

In this preferred embodiment, sinusoidal analog waveform 110 is composed of component sine waves at frequencies of 50, 100 and 150 Mhz, and wherein the center frequency of sinusoidal analog waveform 110 is 100 MHz. Sinusoidal analog waveform 110 is a continuous signal which crosses origin amplitude line 125 every T=5 nsec. Thus, in FIG. 1, timing crosshatches 135 are positioned 20 nsec. apart, and intertiming measurements 137 are positioned at intervals of every 4 nsec. Thus, the timespan depicted on display 120 is 200 nsec. and 40 zero crossings are present.

A plurality of coding amplitude levels 140 are shown symmetrically spaced about origin line 125. Each of these levels is indicative of coding information. Thus, if the peak of one of the individual half cycles reaches the ±100 level, a first value is indicated, whereas if the peak reaches ±130 a second value is indicated. In this manner, 4 different coding levels are provided in FIG. 1, the negative and positive values being interchangeable, thereby allowing coding during each half cycle of a signal waveform. Thus, this scheme allows for the coding of 4 bits per cycle. As is evident from FIG. 1, each of the peaks of waveform 110 reaches one of coding amplitude levels 140, and therefore it is easy to determine which coding level was intended for each wave peak, and the coding values may be readily distinguished. The maximum amplitude is approximately ±190 mV. Since the amplitudes each nearly reach a particular predetermined amplitude coding level and thus the coded valued can be easily and consistently determined, analog waveform 110 conforms closely to its intended shape.

Figure 2:
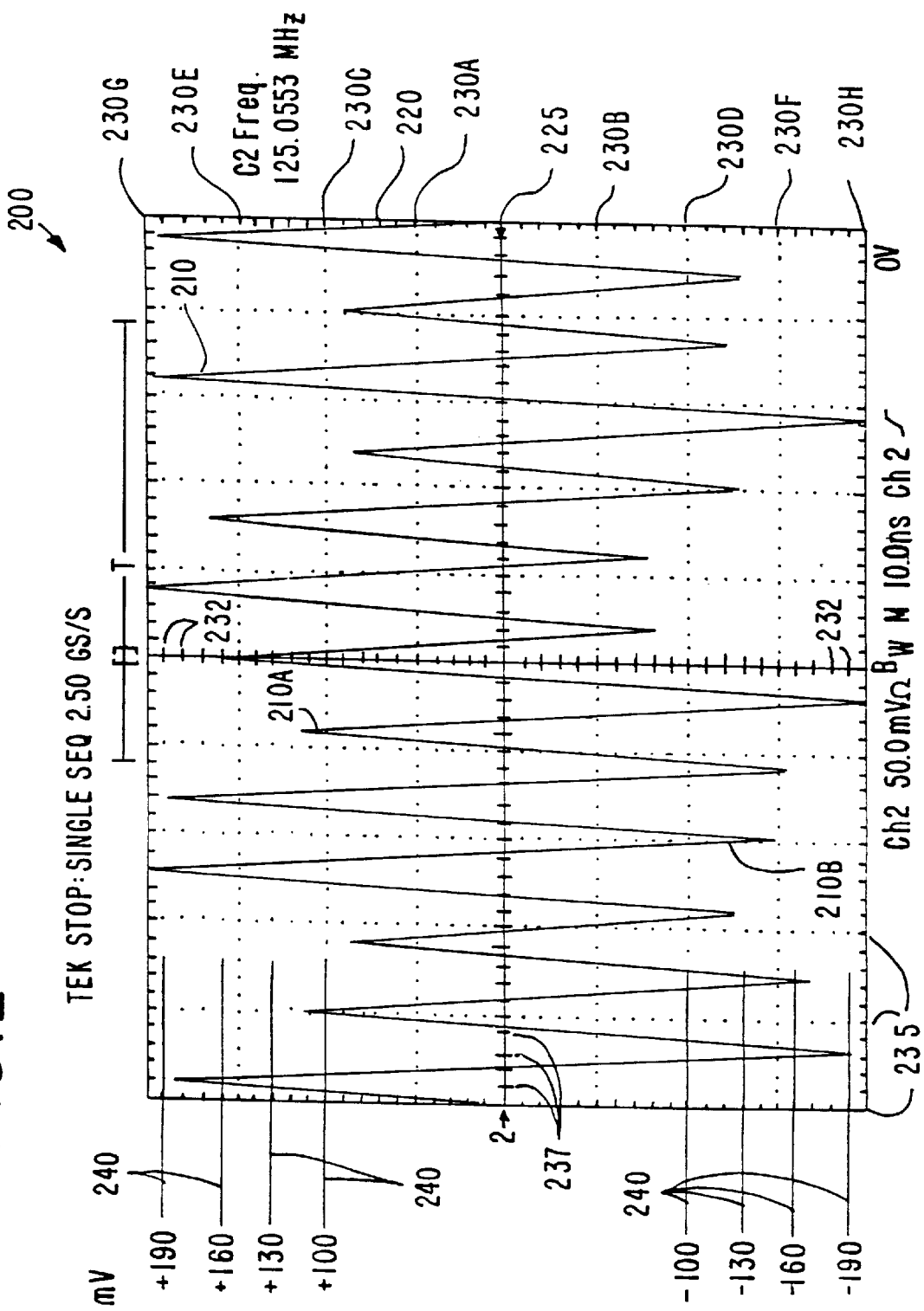
FIG. 2 depicts a graphical representation of an A/D sampling of a distorted sinusoidal analog waveform having a frequency F=125 MHz and a T of 4 nsec, and coding 500 Mbps.

Reference is next made to FIG. 2, which is a view of an analog sinusoidal analog waveform display, indicated generally at 200. An analog sinusoidal waveform 210 is displayed on a display 220. An origin amplitude line 225 is shown, and amplitude crosshatches 230A–230H and interval amplitude measurements 232 are also provided. Finally, timing crosshatches 235 and interval timing measurements 237 are provided along origin amplitude line 225. Thus, the setup of analog waveform display 200 is similar to that of analog waveform display 100 of FIG. 1.

Sinusoidal analog waveform 210 encodes and transmits data at 500 Mbps, with a center frequency of 125 MHz. Sinusoidal analog waveform 210 is a continuous signal which should cross origin amplitude line 225 every T=4 nsec. Thus, in FIG. 2, timing crosshatches 235 are positioned 10 nsec. apart, and intertiming measurements 237 are positioned at intervals of every 2 nsec. Thus, the timespan depicted on display 220 is 100 nsec. and 25 zero crossings are present. However, because some electro-magnetic distortion is present, the zero crossings are not quite evenly spaced, and thus the waveform is slightly out of sync.

A plurality of coding amplitude levels 240 are shown symmetrically spaced about origin line 225. Each of these levels is indicative of coding information. Thus, if the peak of one of the individual half cycles reaches the ±100 level, a first value is indicated, whereas if the peak reaches ±130 a second value is indicated. In this manner, 4 different coding levels are provided in FIG. 2, the negative and positive values being interchangeable, thereby allowing coding during each half cycle of the signal waveform. Thus, this scheme allows for the coding of 4 bits per cycle as well. However, as is evident from FIG. 2, many of the peaks of waveform 210 reach a position between two different amplitude coding levels. For example, peak 210A reaches between the +100 and the +130 amplitude levels. Thus, it is not possible to determine from the peak level which amplitude level was intended at peak 210A. Similarly, peak 210B is positioned between the −130 and the −160 amplitude levels. Thus for these measured peak amplitude levels, it is not possible to determine the intended level. This imprecision of amplitude level is the result of distortion within the transmission apparatus. Since a number of the amplitudes do not reach only one particular amplitude level, the coded value cannot be easily and consistently determined, and analog waveform 210 does not conform closely to its intended shape.

Figure 3:
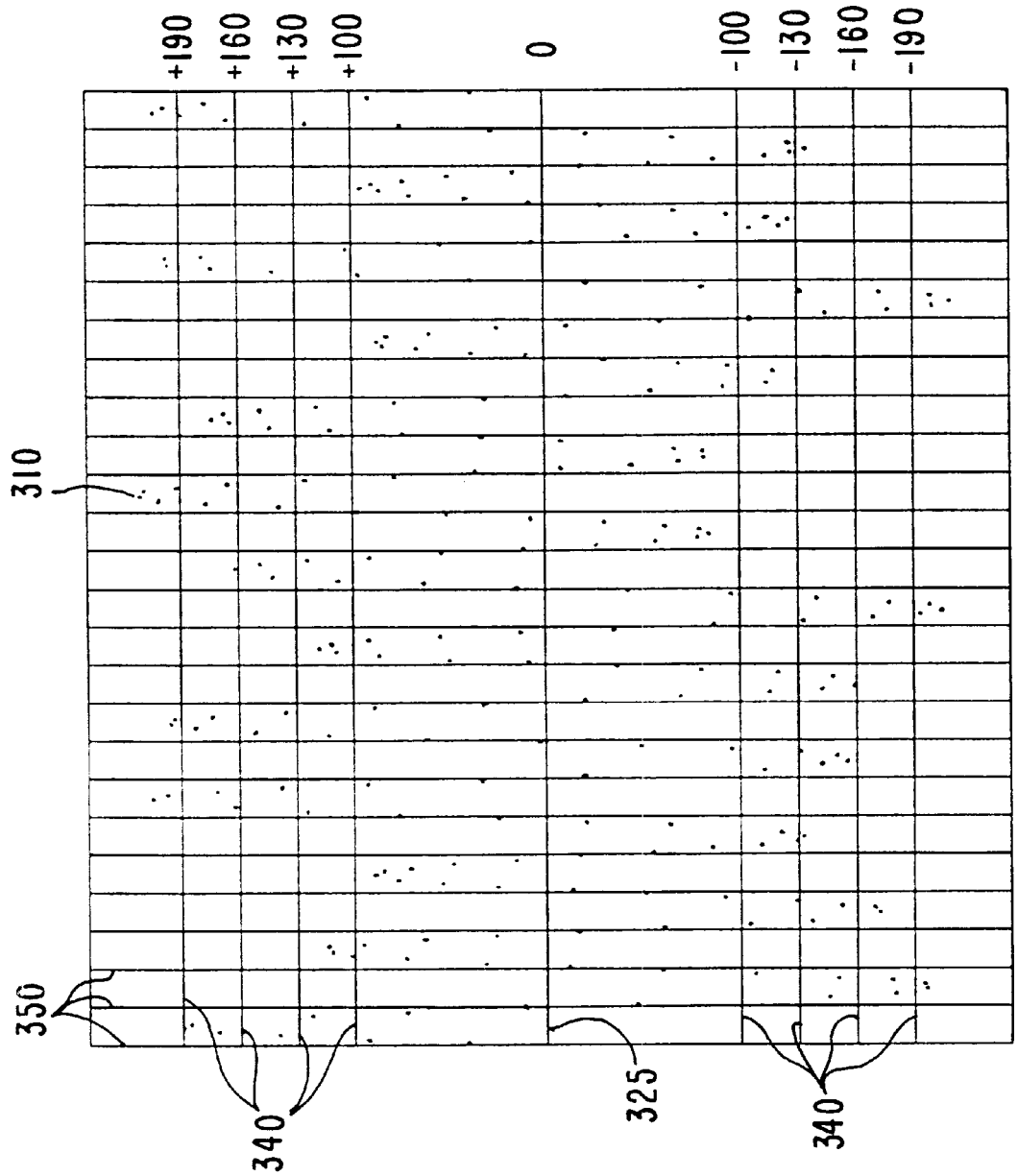
FIG. 3 depicts sampling points of FIG. 2.

As noted above, while the zero crossings in FIG. 2 should take place every T=4 nsec., they are not so evenly spaced as shown. Thus, if sampling were performed on analog waveform 210 every 400 psec. (0.4 nsec.) there should be 10 sampling points between zero crossings. FIG. 3 depicts such a sampling of FIG. 2. However, in FIG. 3, 20 points are shown between zero crossings. This is because the measuring apparatus interpolates one point between each of the measured points to allow a more complete curve to be shown. These interpolated points are also included in FIG. 6 (below), but are omitted from the calculations given in tables 1 or 2 (below). As is shown in FIG. 3, origin line 325 is provided, as are a plurality of digital sample points 310 sampled from sinusoidal analog waveform 210. Also shown are a plurality of amplitude levels 340 similar to those depicted in FIG. 2. As noted above due to distortion during generation and transmission, a number of the peaks of the waveform do not have an amplitude at one of the predetermined amplitude coding levels. Thus, distortion results in uncertainty regarding the amplitude of the signal peaks.

A plurality of timing interval delineations 350 are also provided in FIG. 3. The timing delineations are spaced at 2T=8 nsec. apart. Thus, according to the sampling scheme noted above, there should be 20 samples between delineations 350. However, if the samples are counted, some of the intervals contain 19 samples while some of the intervals contain 21 samples. Therefore, in addition to resulting in amplitude imprecision, distortion of the transmitted signal also may result in the timing of the signal being misaligned, resulting in possible false detections.

Figure 4:
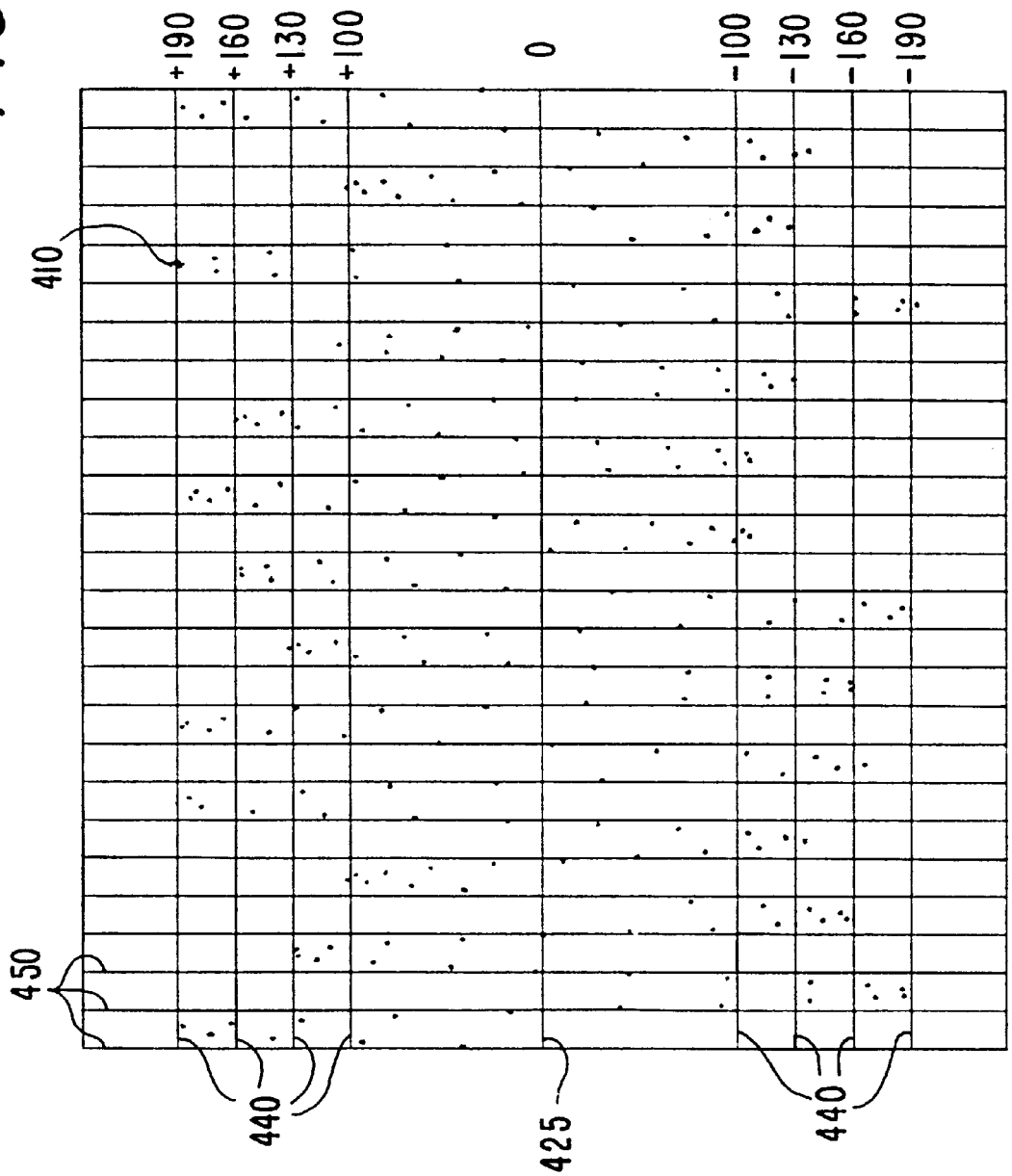
FIG. 4 depicts sampling points of FIG. 2 after the distorted sinusoidal analog waveform has been acted upon by the feedback apparatus of the invention.

FIG. 4 depicts sampling points similar to those of FIG. 3, however, these points have been sampled from a sinusoidal analog waveform after the apparatus constructed in accordance with the invention has been applied thereto. FIG. 4 includes origin line 425, the plurality of amplitude levels 440 and time interval delineations 450. As can be seen in FIG. 4, after processing by the apparatus of the invention, the sampled peaks of the waveform are all positioned far closer to one of the amplitude levels than in the sampled waveform of FIG. 3. Thus, less ambiguity is present in the signal as received, and the coded information can be more reliably retrieved. Additionally, the number of sample points between delineations is more uniformly 20 sample points. The apparatus in accordance with the invention also corrects for timing errors in the signal.

While the peak amplitudes in FIG. 4 are all close to one of the designated amplitude levels, when detecting the coding level of a signal, it is not necessary that the amplitude peak reach exactly the predetermined associated amplitude coding level. Indeed, rather than relying solely on the peak amplitude of the waveform in question, it is a more accurate method to sum the amplitude values of the 10 sample points in each half cycle, between zero crossings and to estimate the area under the curve of the half cycle. For a pure sine curve, the area under the curve from 0 to T, or between any two consecutive zero crossing points is 2 times the amplitude. This amplitude may be approximated by drawing 10 rectangles, each having a height equal to a respective sample point. Thus, the approximation is equal to the sum of the 10 sample points times $\pi/10$, and the sum of the 10 samples is estimated by 20 times the amplitude over $\pi$. For each of the four amplitude levels 100, 130, 160 and 190, this ideal estimated area is 637, 827, 1019 and 1210 mV, respectively. If these are the estimated values of the area under the curve assuming the curve peaks at exactly the proper amplitude level, a value midway between two of these values would be a point where it is not possible to determine between the two alternative amplitude levels. However, any value higher or lower than this middle value is closer to one of the estimated areas, and should then be determined to indicate that level. Thus, the decision midpoint for the area under the curve between the 100 amplitude level and the 130 amplitude level which have estimated area values of 637 and 827, is 732; the decision midpoint for the area under the curve between the 130 amplitude level and the 160 amplitude level, which have estimated area values of 827 and 1019, is 923, and the decision midpoint for the area under the curve between the 160 amplitude level and the 190 amplitude level, which have estimated area values of 1019 and 1210, is 1114.

For a sinusoidal analog waveform generated by blending a plurality of sine waves, such as in the invention, the sum of the ten sample points for each half waveform varies around the ideal, pure sine values systematically, depending upon the sum of the values in the prior and subsequent half cycles primarily, and additionally in accordance with the values in other waveforms more distant therefrom. Therefore, by way of example, if a waveform at −1T from the present waveform has a large amplitude response in comparison with the expected value, the current waveform might also have too high a value, because of a rebound type effect. In accordance with the present invention, the method and apparatus are provided which seek to determine various weighting values for both prior and subsequent waveforms which achieve a balance between the narrowest range of sums at a coding level, and the greatest minimum distance between the various coding levels. Delay paths are provided with appropriate weightings so that the amplitude and shape of prior and subsequent waveforms can be compensated for in the present waveform, thereby reducing the effects thereof, and generating a compensated waveform which more closely conforms to an ideal waveform. By way of example, the waveform sample points as shown in FIG. 4 were generated through the use of this procedure on the waveform sample points of FIG. 3. The area under the curve estimated by the 10 sample points prior to a current waveform, which comprise the prior half cycle at −1T, was given a weight of 0.11, the area under the curve estimated by the 10 sample points of the current waveform was given a weight of 0.78, and the area under the curve estimated by the 10 points subsequent to the current waveform, which comprise the subsequent half cycle at +1T, was given a weight of 0.11 as well. 0.11+0.78+0.11=1, and therefore it is not necessary to further scale the resulting waveform, since the sum of the weighted amplitudes will be in the proper range. Thus, the expression used to determine the amplitude "a" of each waveform which should be generated is $a(t-T) = -0.11*v(t)+0.78*v(t-T)-0.11*v(t-2T)$.

Table 1, which is set forth below, depicts various statistics to determine the improvement in performance of the apparatus in accordance with the invention, by comparing the resulting compensated output signal of FIG. 4 after application of the present invention, with the uncompensated signal shown in FIG. 3. Specifically, the first portion of Table 1 depicts the various sums of the sample points beneath each half cycle shown in FIG. 3, which is uncompensated, and each half cycle shown in FIG. 4, which is compensated. As should be noted, the expression noted above which is used in the actual compensation apparatus is a continuous expression, while the sampling of 10 sample points per half cycle is a digital type component. However, this digital type component approximates quite well the analog values which would be determined by the expression. This same relationship holds for integrated circuit implementations and DSP implementations that sum the area in each $\pi$ lobe of the received waveform. Thus, when estimating the compensated results of FIG. 4 for the second measured sample in FIG. 3 of −1344, the expression $$-0.11*(1188)+0.78*(-1344)-0.11*(607)$$

is used. Thus, the coefficient −0.11 is multiplied by the area measured for the prior sample for −1T, and the area measured for the subsequent sample for +1T, while the coefficient 0.78 is multiplied by the area measured for the current sample for T. The result of this expression is 1246, which is as is shown as the second measurement in the data obtained from FIG. 4. In this manner, each of the values of the data on FIG. 4 can be determined from the data of FIG. 3, using the above-noted expression. While compensation may be performed through a mathematical algorithm, as will be discussed below, it is also possible to employ hardware for implementing the lag and lead delay time weightings as well.

Table 1 also accumulates statistics regarding the quality of the various readings in the pre-compensated waveform of FIG. 3, and the post-compensated waveform of FIG. 4. As is shown in the second portion of Table 1, for each of FIGS. 3 and 4, the area readings indicative of one of the four amplitude levels are calculated, and a minimum value, a maximum value and an average value indicative of the dispersion of the area readings is provided. From these minimum and maximum values, a range of values which is intended to designate a particular amplitude level is shown. As can be seen, the range of measured values indicative of each amplitude level in FIG. 3 is much greater than the range of measured values indicative of each amplitude level in FIG. 4. Thus, in FIG. 4, the area readings which are intended to designate a particular amplitude level are more clustered about that amplitude level, and therefore are more likely to give a precise reading. Hence, the confidence that a reading is correct is improved.

A further calculation shown in Table 1 depicts the minimum distance between measured values which is indicative of adjacent particular coding levels. For example, the first value on FIG. 3 of 607 minus 516 is the difference between the lowest level intended to designate the 130 millivolt coding level, minus the highest level intended to designate the 100 millivolt level. Since the ranges of the measured pre-compensated values indicative of each amplitude level in FIG. 3 are much greater than those of FIG. 4, the distances between these values indicative of adjacent coding levels is much smaller. Therefore, values indicative of adjacent coding levels in FIG. 3 are more likely to overlap than in FIG. 4, thus giving a false reading. Thus, once again, one has more confidence in the selection of a value using the technique represented by FIG. 4, than the technique represented by FIG. 3.

The high and low area values indicative of each particular coding level, thus forming a decision range for each particular coding level in FIG. 3 and FIG. 4, is shown in Table 1. If a measured area value for an unknown waveform falls between two values, it will be considered to indicate the amplitude coding level with which these two values are associated. The ranges in FIG. 3 are wider than those of FIG. 4. This might lead one to think that it would be easier for a value to fall within the wider range and that thus the FIG. 3 waveform is more accurate: this is in fact not true. The reason the ranges generated by the technique of FIG. 4 are smaller is because, as noted above, the measured area values are far more clustered, having less variability. Therefore while the absolute values of the ranges are smaller in the data generated by the technique of FIG. 4, the ranges are actually larger as compared with the variability of the unknown area measurements made. Thus, as is finally shown in Table 1, two errors were made in the determination of 25 coding levels in FIG. 3, while in the waveform of FIG. 4, no errors were made.

TABLE 1

Sum of 10 A/D sample points left to right in mV

| on FIG. 3 | | on FIG. 4 | |
| --- | --- | --- | --- |
| 1188 | −1344 | 1209 | −1246 |
| 607 | −1210 | 755 | −1059 |
| 447 | −795 | 569 | −819 |
| 1375 | −930 | 1262 | −1022 |
| 1316 | −1048 | 1245 | −1031 |
| 624 | −1423 | 759 | −1295 |
| 1061 | −375 | 1027 | −580 |
| 1560 | −364 | 1298 | −587 |
| 1192 | −844 | 1062 | −834 |
| 402 | −1420 | 562 | −1297 |
| 1316 | −778 | 1268 | −808 |
| 516 | −810 | 577 | −840 |
| 1379 | | 1279 | |

Statistics by coding level (mV)

| Level | Minimum | Average | Maximum | Range |
| --- | --- | --- | --- | --- |
| | | on FIG. 3 | | |
| 100 | 364 | 421 | 516 | 152 |
| 130 | 607 | 743 | 844 | 237 |
| 160 | 930 | 1088 | 1210 | 280 |
| 190 | 1188 | 1369 | 1560 | 372 |
| | | on FIG. 4 | | |
| 100 | 562 | 575 | 587 | 25 |
| 130 | 755 | 803 | 840 | 85 |
| 160 | 1022 | 1043 | 1062 | 40 |
| 190 | 1209 | 1267 | 1298 | 89 |

Minimum distances between coding levels (mV)

| on FIG. 3 | on FIG. 4 |
| --- | --- |
| 607 − 516 = 91 | 755 − 587 = 168 |
| 930 − 844 = 86 | 1022 − 840 = 182 |
| 1188 − 1210 = −22 | 1209 − 1062 = 147 |

Decision ranges by level (mV)

| | on FIG. 3 | on FIG. 4 |
| --- | --- | --- |
| 100 | 350, 561 | 500, 671 |
| 130 | 562, 887 | 672, 931 |
| 160 | 888, 1199 | 932, 1135 |
| 190 | 1200, 1600 | 1136, 1350 |

Errors in 25 Decisions

| on FIG. 3 | 2 |
| --- | --- |
| on FIG. 4 | 0 |

Figure 5:
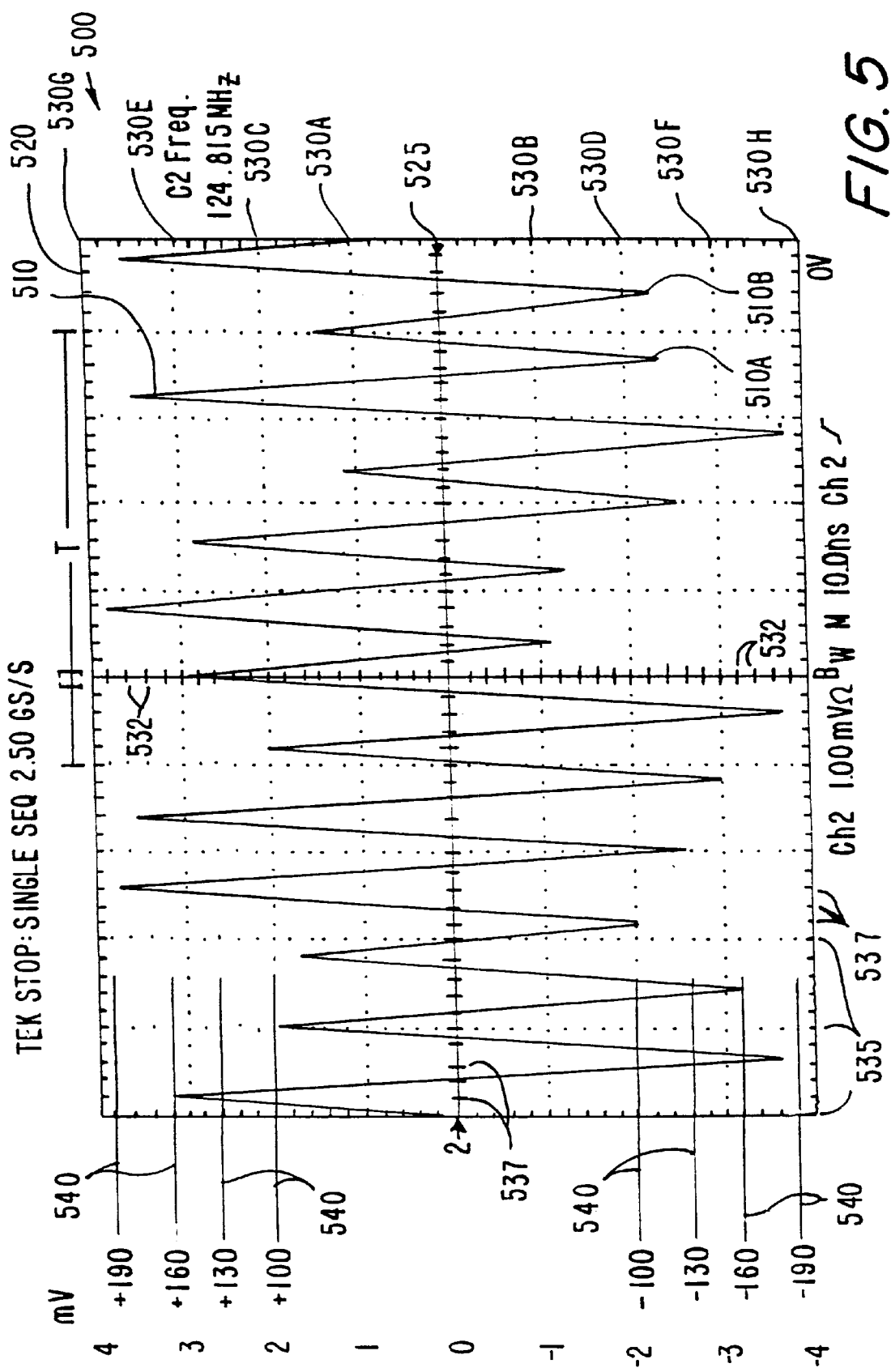
FIG. 5 depicts a graphical representation of an A/D sampling of an analog sinusoidal waveform encoding 500 Mbps after transmission through 1500 feet of coaxial cable and passing through an equalizing circuit and showing distortion of the waveform.

Reference is next made to FIG. 5 which depicts a second example of a trace of an incoming waveform similar to that shown in FIG. 2. An analog sinusoidal waveform 510 is displayed on a display 520 having an origin amplitude line 525, amplitude cross hatches 530A–530H, interval amplitude measurements 532, timing cross hatches 535, interval timing measurements 537, and a plurality of coding levels 540. In this example, the same input wave signal was used as that in FIG. 2, but here, the input wave signal was passed through a frequency dependent attenuation equalizing circuit, and then transmitted through 1500 feet of coaxial wire cable. This figure shows substantial electro-magnetic distortion, as is evident from FIG. 6, which is a computer graphic overlay of the sample points of FIG. 5, similar to that shown in FIG. 3, and which includes a center line 635, various amplitude levels 640, timing sequence levels 650, and a sampling signal 610. As can be seen from FIG. 6, a number of the peak amplitudes of the waveforms are positioned halfway between two of the various adjacent coding levels. Attention is specifically drawn to the last two negative wave peaks 510A and 510B in FIG. 5 which are positioned between the −100 and −130 amplitude levels. Thus, after transmitting the signal through coaxial wire cable, it can be seen that it would be very difficult to determine the value of a number of these amplitude levels with any confidence.

Figure 6:
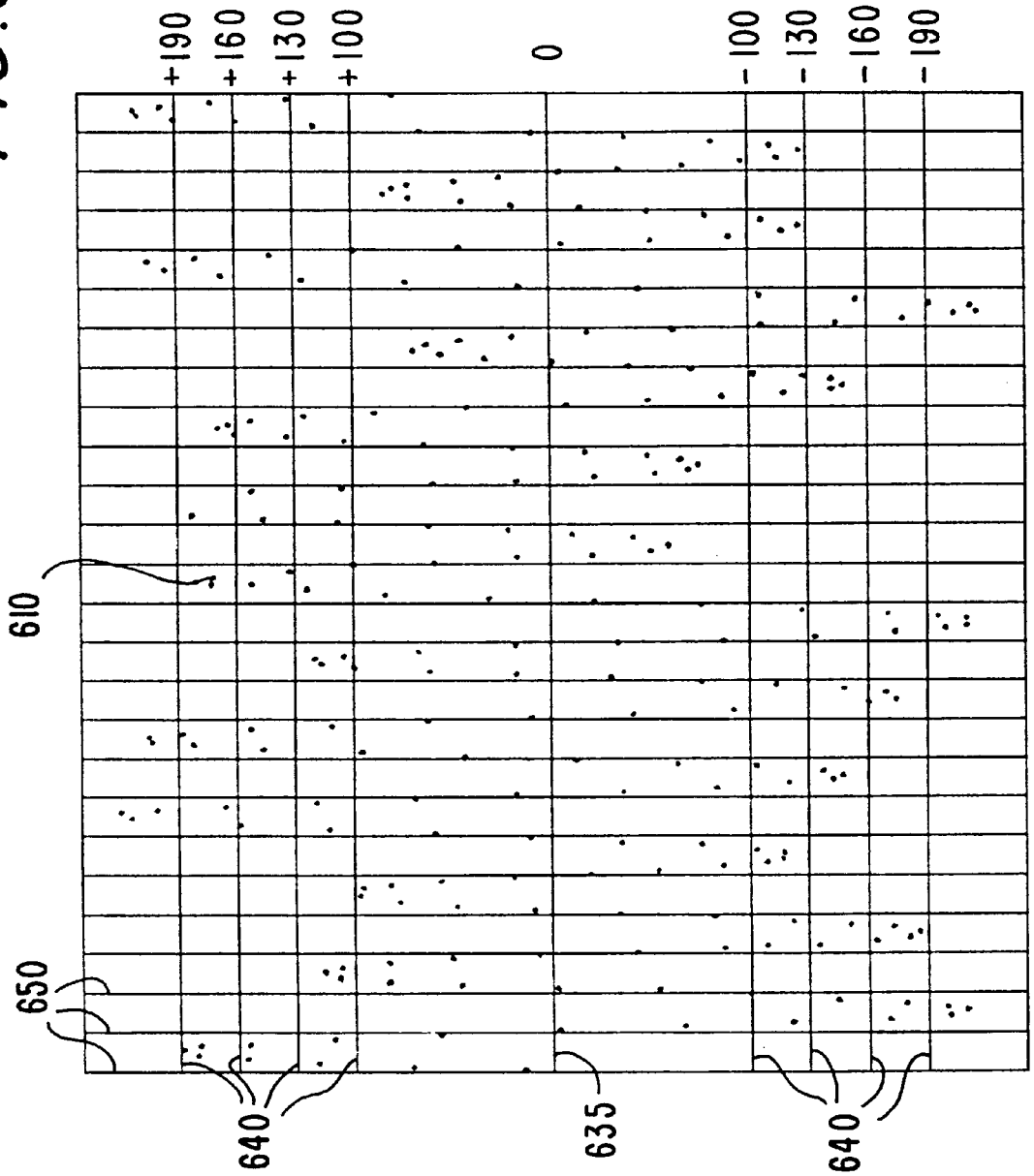
FIG. 6 depicts the sampling points of FIG. 5.
Figure 7:
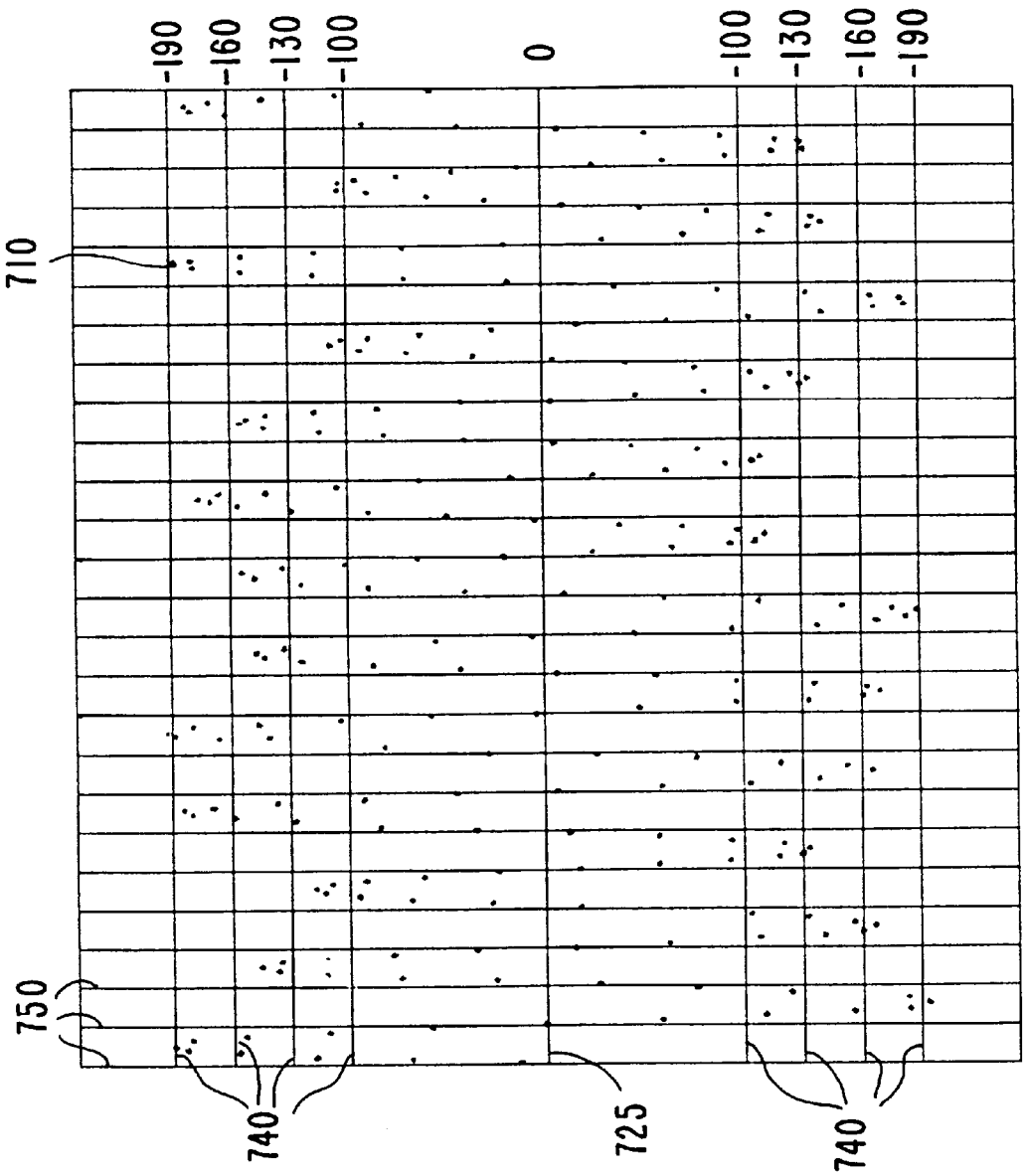
FIG. 7 depicts sampling points of FIG. 5 after the distorted sinusoidal analog waveform has been acted upon by the feedback apparatus of the invention.

FIG. 7 depicts the signal sample of FIG. 6, after performing the method of the invention. FIG. 7 is therefore similar in form to FIG. 4, and includes a center line 725, a sample signal 710, various amplitude levels 740, and timing sequence intervals 750. As can be seen from FIG. 7, each of the amplitude levels is closer to a predetermined desired amplitude level, and is therefore easier to determine precisely the current intended value therefor, as compared to the amplitude levels of FIG. 6. However, as noted above, rather than simply measure the peak amplitude level of each half cycle, the measurement of the area underneath the curve of each half cycle is a better, more accurate measure to determine the intended encoding level. Reference is next made to Table 2, shown below which provides data similar to that of Table 1, but this Table 2 provides information regarding FIGS. 6 and 7.

At the top of Table 2, the measured area values for each of the 10 sample points are shown. It should be noted that all of the sample points measured herein were provided with a gain of 50 to counteract an attenuation factor of 50 times, for a total loss of −34 decibels during transmission along the 1500 feet of coaxial cable. A further gain scaling adjustment was provided to compensate for fixed added A/D sampler ranges in the prototype hardware, whereby value for the area was replaced by the expression 4mV+1.17*XmV. FIG. 7 was generated by applying the present invention to the samples of FIG. 6. Proper weightings were determined by an iterative process of varying the various weightings, and transmitting a signal through the proposed transmission medium. By feeding the transmitted signal to the transmission analysis, it was determined which weighting factors generated the best resulting waveform. It was determined by this iterative process that the most efficient weighting scheme is 0.08 for the area under the curve for the 11–20 points prior to the current reading (a second order effect, 2T lag applied to the prior waveform), 0.16 for the area under the curve for the 1–10 points prior to the current reading (1T lag applied to the prior waveform), 0.63 for the area under the curve at the 10 current points of the current reading, and a weight of 0.13 for the area under the curve for the 1–10 points after the current waveform (1T lead applied to the subsequent waveform). The weights sum to 1. Therefore, the formula for converting from the pre-compensated values (subjected to distortion) to the post-compensated values for generating a compensated analog waveform having an amplitude "a" as determined in this example, and in accordance with the invention is:

$$a(t-T)=-0.13*v(t)+0.63*v(t-T)-0.16*v(t-2T)+0.8*v(t-3T).$$

The weightings for this expression need only be calculated once, and can be applied to any waveform being transmitted by this transmission apparatus. The values for FIG. 7 can be calculated by this expression, or by actual measurements.

Reviewing the statistics in Table 2, it can be seen that the ranges in FIG. 7 for the various measured values associated with particular coding levels are narrower than the ranges determined for the measured values of FIG. 6, the distances between the various coding levels are much greater in FIG. 7 than in FIG. 6. The resulting number of errors in FIG. 6 is 4 out of 25, or a 16% error rate, while in FIG. 7 no errors were made. Thus, in accordance with the invention, the amplitude determination is much more accurate and repeatable.

TABLE 2

Sum of 10 A/D sample points left to right in mV

| on FIG. 6 | | on FIG. 7 | |
| --- | --- | --- | --- |
| 1227 | −1380 | 1234 | −1234 |
| 566 | −1298 | 844 | −1093 |
| 563 | −710 | 700 | −835 |
| 1489 | −845 | 1206 | −1008 |
| 1382 | −1091 | 1267 | −1051 |
| 569 | −1552 | 845 | −1298 |
| 1097 | −122 | 1001 | −599 |
| 1717 | −286 | 1226 | −619 |
| 1188 | −982 | 1057 | −857 |
| 196 | −1528 | 574 | −1253 |
| 1392 | −725 | 1231 | −859 |
| 435 | −798 | 605 | −826 |
| 1511 | | 1244 | |

Statistics by coding level (mV)

| Level | Minimum | Average | Maximum | Range |
| --- | --- | --- | --- | --- |
| | | on FIG. 6 | | |
| 100 | 196 | 320 | 563 | 367 |
| 130 | 566 | 725 | 982 | 416 |
| 160 | 845 | 1104 | 1298 | 453 |
| 190 | 1227 | 1464 | 1717 | 490 |
| | | on FIG. 7 | | |
| 100 | 574 | 619 | 700 | 126 |
| 130 | 826 | 844 | 859 | 33 |
| 160 | 1001 | 1042 | 1093 | 92 |
| 190 | 1206 | 1244 | 1298 | 92 |

Minimum distances between coding levels (mV)

| on FIG. 6 | on FIG. 7 |
| --- | --- |
| 566 − 563 = 3 | 826 − 700 = 126 |
| 845 − 982 = −137 | 1001 − 859 = 142 |
| 1227 − 1298 = −71 | 1206 − 1093 = 113 |

Decision ranges by level (mV)

| | on FIG. 6 | on FIG. 7 |
| --- | --- | --- |
| 100 | 150, 564 | 500, 763 |
| 130 | 565, 931 | 764, 930 |
| 160 | 932, 1262 | 931, 1149 |
| 190 | 1263, 1750 | 1150, 1350 |

TABLE 2-continued

Errors in 25 Decisions

| on FIG. 6 | 4 |
| --- | --- |
| on FIG. 7 | 0 |

Figure 8:
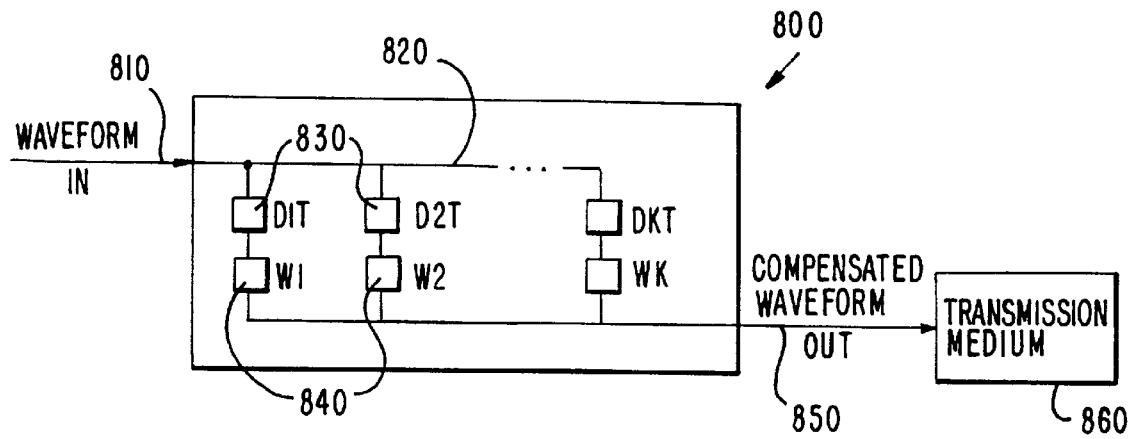
FIG. 8 depicts an analog sinusoidal waveform distortion compensating apparatus constructed in accordance with an embodiment of the invention using various delay lines.

Reference is next made to FIG. 8 which depicts a delay line apparatus 800 constructed in accordance with the invention. Delay line apparatus 800 may be used to implement the method of the invention in a mechanical apparatus, rather than requiring the mathematical solution provided above and is shown implemented at the transmission apparatus, but may be implemented at the receiving apparatus. Because the processing function may be hard wired, processing time may be improved. In its simplest form, each of the delay loops D1T, D2T . . . DKT can be implemented as lengths of wire have propagation times of 1T, 2T, . . . , KT, respectively to provide the appropriate determined time delay to compensate for the electro-magnetic distortion arising from transmission of the compensated analog waveform through a transmission medium 860, which in various embodiments comprises metallic wire, fiber optic material, an RF mixer, a magnetic recording write head or an electro-optic converter among other transmission media. Alternatively, rather than using lengths of wire as the delay loops, various precision passive analog components that have appropriate propagation times of 1T, 2T, etc. may be used. Coupled with each of the passive analog delay components, or wire delay loops, is a weighting feature for allowing a particular weight to be applied to each signal which has been delayed a predetermined amount of time. During use, a waveform is fed in at port 810 and is forwarded along bus 820 through apparatus 800 and output at 850 for transmission over transmission medium 860. The input signal waveform fed in at port 810 is then passed to each delay wire 830, which delays the signal a predetermined integer number of T amounts, and applies a weight 840 thereto. Thereafter, all of the weighted delay signals are added together to form a compensated waveform output at 850. The compensated waveform is thus formed of a combination of current, past and future waveforms, each given appropriate weightings.

Figure 9:
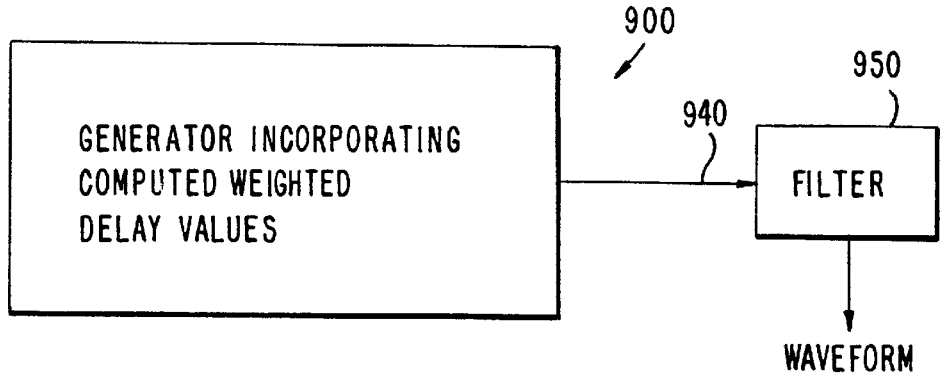
FIG. 9 depicts a precompensation generator constructed in accordance with an additional embodiment of the invention.

Referring next to FIG. 9, a precompensation generator 900 is depicted for generating a compensated analog waveform after receipt of a distorted analog signal, but could also be used before transmission thereof. Precompensation generator 900 operates similarly to that of the prior embodiment shown in FIG. 8, but rather the coding amplitude voltage levels are precompensated to cancel the distortion that will occur so that the received signal matches the ideal coding amplitude voltage levels. The compensated analog waveform is applied to a filter 950 to be smoothed out. Therefore, while the distorted signal is still measured and the compensation in each of the weighted delay paths is computed, these results are incorporated into generator 900. While a predistorted waveform will be output at 940, since the coding amplitude levels are adjusted, the accuracy achieved using the apparatus of FIG. 9 will be similar to that using the apparatus shown in FIG. 8.

Figure 10:
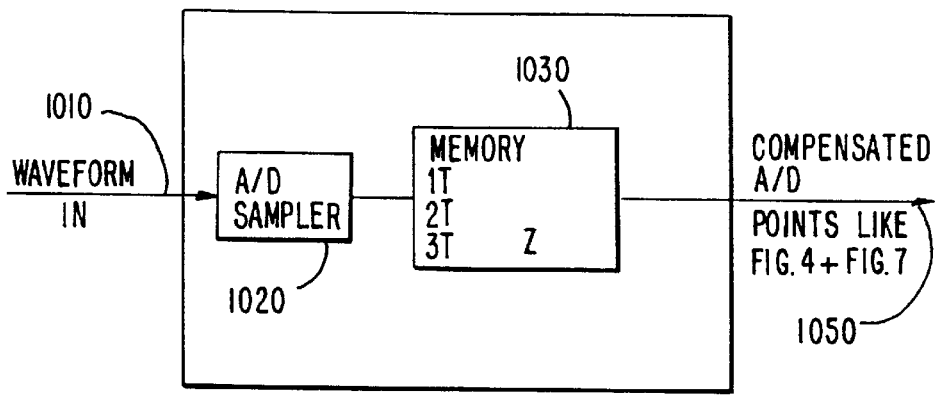
FIG. 10 depicts a digital signal processor or a digital logic processor constructed in accordance with an additional embodiment of the invention.

Finally, referring to FIG. 10, a digital signal processing, real time computational apparatus is provided whereby rather than mechanically providing analog delay times and weightings as in FIG. 8, a memory is provided for a particular delay time and the weighting for each particular delay path, and may be used to implement the mathematical calculations noted above. Hence, the waveform is fed in at waveform input 1010 and sampled by A/D sampling block 1020. The resultant samples are fed to memory block 1030 in which are stored various weightings and delay signals, these delay signals and weightings being determined by an iterative process, as noted above. This is the procedure used to generate Tables 1 and 2 above, i.e. the various weightings may be provided in a single mathematical formula which is stored in memory and is applied to the sampled digital values sampled from the input waveform and any further input waveforms transmitted by the same transmission apparatus. If the transmission apparatus or transmission path changes, new delay path weightings may be determined through the above-mentioned iterative process to compensate for any changed distortion characteristics. At each appropriate clock time, compensated points such as those shown in FIG. 4 and FIG. 7 are outputted at compensated output port 1050. Therefore, rather than providing a continuous compensated waveform, a plurality of discrete compensated digital values are provided, thereby allowing for increased speed in making the determination of amplitude value.

It will thus be seen that the objects set forth above, along with those made apparent from the preceding description, are efficiently attained and, since certain changes may be made in carrying out the above method and in a construction set forth without departing from the spirit and scope of the invention, it is intended that all matter contained in the above description and shown in the accompanying drawings shall be interpreted as illustrative and not in a limiting sense.

It is also to be understood that the following claims are intended to cover all of the generic and specific features of the invention hereindescribed and all statements of the scope of the invention which, as a matter of language, might be said to fall therebetween.

What is claimed is:

1. A method of compensating for the systematic electromagnetic distortions during generation and transmission of amplitude coded sinusoidal waveforms due to the varying rate of change in these waveforms, comprising the steps of:
    transmitting an analog waveform formed as an interference pattern generated by the combination of at least three substantially sinusoidal waves, said analog waveform representing input data which is divided into N-bit data segments, where N is an integer greater than one, each of said substantially sinusoidal waves having at least one controllable wave characteristic which is controlled as a function of an N-bit data segment;
    determining an electro-magnetic distortion generated within a transmission apparatus for transmitting said analog waveform by comparing said transmitted analog waveform with a feedback received analog waveform;
    delaying said analog waveform through each of at least two delay paths having predetermined respective delay time intervals to generate a respectively delayed analog signal at each delay path;
    determining respective weightings associated with each of said at least two delay paths;
    generating a weighted delayed analog signal at each delay path by multiplying each of said delayed analog signal by said weighting associated with said associated delay path; and
    combining said weighted delayed analog signals from each of said delay paths to generate a compensated analog waveform to correct for said electro-magnetic distortion in said analog waveform.

2. The method of claim 1, wherein said analog waveform has a fundamental frequency of $F=\frac{1}{2}T$ with zero crossings at every T seconds.

3. The method of claim 2, wherein each said respective delay time interval is a respective integer multiple of T seconds.

4. The method of claim 1, wherein said analog waveform is an alternating current (A.C.) sinusoidal analog waveform.

5. The method of claim 1, wherein said respective weightings associated with each of said delay paths are determined by an iterative process, and said respective weightings sum to 1.

6. The method of claim 5, wherein said iterative process determines said respective weighting for each of said delay paths to achieve a balance between a narrowest range in a plurality of measured values of said compensated analog waveform indicative of a particular amplitude coding level and a greatest minimum distance between adjacent coding levels.

7. The method of claim 1, wherein said delayed analog signal is formed by feeding said analog waveform through a delay circuit.

8. The method of claim 7, wherein each said respective delay time interval is equal to a respective integer multiple of the inverse of twice the frequency of said analog waveform.

9. The method of claim 7, wherein the number of delay paths and the respective weighting associated with each delay path are determined by an iterative process to achieve a balance between a narrowest range in a plurality of measured values of said compensated analog waveform indicative of a particular coding level and a greatest minimum distance between adjacent coding levels.

10. The method of claim 1, wherein said weightings for said delay paths are determined, and said compensated analog waveform is formed before transmission of said compensated analog waveform.

11. The method of claim 1, wherein said weightings for said delay paths are determined, and said compensated analog waveform is formed upon receipt of said analog waveform.

12. The method of claim 1, wherein said analog waveform and said compensated analog waveform are transmitted along metallic wire.

13. The method of claim 1, wherein said analog waveform and said compensated analog waveform are transmitted along a conduit formed of fiber optic material.

14. The method of claim 1, wherein said analog waveform and said compensated analog waveform are transmitted into an RF mixer.

15. The method of claim 1, wherein said analog waveform and said compensated analog waveform are transmitted into a magnetic recording write head.

16. The method of claim 1, wherein said analog waveform and said compensated analog waveform are transmitted into an electro-optic converter.

17. The method of claim 1, wherein said analog waveform and said compensated analog waveform are received from an RF mixer.

18. The method of claim 1, wherein said analog waveform and said compensated analog waveform are received from a magnetic recording read head.

19. The method of claim 1, wherein said analog waveform and said compensated analog waveform are received from an opto-electronic converter.

20. The method of claim 1, wherein said analog waveform and said compensation analog waveform are received from a metallic wire.

21. Apparatus for compensating for the systematic electro-magnetic distortion during generation and transmission of amplitude coded sinusoidal waveforms due to the varying rate of change of these waveforms, comprising:

means for transmitting an analog waveform formed as an interference pattern generated by the combination of at least three substantially sinusoidal waves, said analog waveform representing input data which is divided into segments of N-bits of data, where N is an integer greater than one, each of said substantially sinusoidal waves having at least one controllable wave characteristic which is controlled as a function of a segment of said N-bits of data;

measuring means for determining an electro-magnetic distortion generated within a transmission apparatus for transmitting said analog waveform by comparing said transmitted analog waveform with a feedback received analog waveform;

delaying means for delaying said analog waveform through each of at least two delay paths having respective delay time intervals to generate a respectively delayed analog signal at each delay path;

delay path weighting means for providing respective weightings associated with each of said at least two delay paths and multiplying said respectively delayed analog signals by a respective weighting for each of said at least two delay paths to generate respective weighted delayed analog signals; and a signal combiner for combining each of said weighted delayed analog signals to generate a compensated analog waveform for correcting said electro-magnetic distortion in said analog waveform.

22. The apparatus of claim 21, wherein said analog waveform has a fundamental frequency of F=½T with zero crossings at every T seconds.

23. The apparatus of claim 22, wherein each said respective delay time interval is an integer multiple of T seconds.

24. The method of claim 21, wherein said analog waveform is an alternating current (A.C.) sinusoidal analog waveform.

25. The apparatus of claim 21, wherein said respective weightings associated with each of said delay paths are determined by an iterative process, and said respective weightings sum to 1.

26. The apparatus of claim 25, wherein said iterative process determines said respective weighting for each of said delay paths to achieve a balance between a narrowest range in a plurality of measured values of said compensated analog waveform indicative of a particular coding level and a greatest minimum distance between adjacent coding levels.

27. The apparatus of claim 21, wherein each of said delay paths comprises a delay circuit exhibiting a respective predetermined delay time interval.

28. The apparatus of claim 27, wherein said delay circuit comprises a wire of a predetermined length having a predetermined transmission time.

29. The apparatus of claim 28, wherein said predetermined transmission time is equal to an integer multiple of the inverse of twice the frequency of said analog signal.

30. The apparatus of claim 27, wherein said delay circuit comprises a memory which receives said analog waveform and outputs said associated delayed analog signal after said respective predetermined delay time interval has passed.

31. The apparatus of claim 28, wherein said respective delay time interval is equal to a respective integer multiple of the inverse of twice the frequency of said analog signal.

32. The apparatus of claim 27, wherein the number of delay paths and the associated weighting for each delay path are determined by an iterative process to achieve a balance between a narrowest range in a plurality of measured values of said compensated analog waveform indicative of a particular coding level and a greatest minimum distance between adjacent coding levels.

33. The apparatus of claim 21, wherein said weighted delayed analog signals are determined, and said compensated analog waveform is formed, prior to transmission of said compensated analog waveform from said apparatus.

34. The apparatus of claim 21, wherein said weighted delayed analog signals are determined, and said compensated analog waveform is generated, after receipt of said analog waveform transmitted to said apparatus.

35. The apparatus of claim 34, further comprising a digital signal processor real-time computational apparatus for generating said compensated analog waveform.

36. The apparatus of claim 21, further comprising a digital signal processor, real-time computational apparatus for generating said compensated analog waveform.

37. A method of compensating for the systematic distortion of transmitted amplitude coded sinusoidal-like alternating current (A.C.) waveforms due to the varying rate of change in these waveforms, comprising the steps of:

transmitting over a transmission system an analog waveform representing input data which is divided into segments of N-bits of data, where N is an integer greater than one;

measuring distortion generated within said transmission system;

delaying said analog waveform through each of at least two delay paths having a respective delay time interval to generate a respective delayed analog signal at each delay path;

determining respective weightings associated with said at least two delay paths;

generating a weighted delayed analog signal at each delay path by multiplying each of said delayed analog signals by said weighting associated with said associated delay path; and combining said weighted delayed analog signals from each of said delay paths to generate a compensated analog waveform to correct for said distortion in said analog waveform.

38. The method of claim 37, wherein said analog waveform has a fundamental frequency of F=½T with zero crossings at every T seconds.

39. The method of claim 38, wherein said respective delay time interval is a respective integer multiple of T seconds.

40. The method of claim 37, wherein said analog waveform is an alternating current (A.C.) sinusoidal analog waveform.

41. The method of claim 37, wherein said respective weightings associated with each of said delay paths are determined by an iterative process, and said respective weightings sum to 1.

42. The method of claim 41, wherein said iterative process determines said respective weighting for each of said delay paths to achieve a balance between a narrowest range in a plurality of measured values of said compensated analog waveform indicative of a particular amplitude coding level and a greatest minimum distance between adjacent coding levels.

43. The method of claim 37, wherein said delayed analog signal is formed by feeding said analog waveform through a delay circuit.

44. The method of claim 43, wherein each said respective delay time interval is equal to a respective integer multiple of the inverse of twice the frequency of said analog waveform.

45. The method of claim 41, wherein the number of delay paths and the respective weighting associated with each delay path are determined by an iterative process to achieve a balance between a narrowest range in a plurality of measured values of said compensated analog waveform indicative of a particular coding level and a greatest minimum distance between adjacent coding levels.

46. The method of claim 37, wherein said weightings for said delay paths are determined, and said compensated analog waveform is formed before transmission over said transmission system.

47. The method of claim 37, wherein said weightings for said delay paths are determined, and said compensated analog waveform is formed upon receipt of said analog waveform over said transmission system.

48. The method of claim 37, wherein said analog waveform and said compensated analog waveform are transmitted along metallic wire.

49. The method of claim 37, wherein said analog waveform and said compensated analog waveform are transmitted along a conduit formed of fiber optic material.

50. The method of claim 37, wherein said analog waveform and said compensated analog waveform are transmitted into an RF mixer.

51. The method of claim 37, wherein said analog waveform and said compensated analog waveform are transmitted into a magnetic recording write head.

52. The method of claim 37, wherein said analog waveform and said compensated analog waveform are transmitted into an electro-optic converter.

53. The method of claim 37, wherein said analog waveform and said compensated analog waveform are received from an RF mixer.

54. The method of claim 37, wherein said analog waveform and said compensated analog waveform are received from a magnetic recording read head.

55. The method of claim 37, wherein said analog waveform and said compensated analog waveform are received from an opto-electronic converter.

56. The method of claim 37, wherein said analog waveform and said compensated analog waveform are received from a metallic wire.

57. Apparatus for compensating for systematic distortion of transmitted amplitude coded sinusoidal-like alternating current (A.C.) waveforms due to the varying rate of change of these waveforms, comprising:

means for transmitting over a transmission system an analog waveform representing input data which is divided into segments of N-bits of data, where N is an integer greater than one;

measuring means for measuring distortion generated within said transmission system;

delaying means for delaying said analog waveform through each of at least two delay paths having a respective delay time interval to generate a respective delayed analog signal at each delay path;

delay path weighting means for providing respective weightings associated with said at least two delay paths and multiplying said respective delayed analog signals by said respective weightings for said at least two delay paths to generate respective weighted delayed analog signals; and a signal combiner for combining each of said weighted delayed analog signals to generate a compensated analog waveform for correcting said distortion in said analog waveform.

58. The apparatus of claim 57, wherein said analog waveform has a fundamental frequency of $F=\frac{1}{2}T$ with zero crossings at every T seconds.

59. The apparatus of claim 58, wherein said respective delay time interval is an integer multiple of T seconds.

60. The method of claim 57, wherein said analog waveform is an alternating current (A.C.) sinusoidal analog waveform.

61. The apparatus of claim 57, wherein said respective weightings associated with each of said delay paths are determined by an iterative process, and wherein said respective weightings sum to 1.

62. The apparatus of claim 61, wherein said iterative process determines said respective weighting for each of said delay paths to achieve a balance between a narrowest range in a plurality of measured values of said compensated analog waveform indicative of a particular coding level and a greatest minimum distance between adjacent coding levels.

63. The apparatus of claim 57, wherein each of said delay paths comprises a delay circuit exhibiting a respective predetermined delay time interval.

64. The apparatus of claim 63, wherein said delay circuit comprises a wire of a predetermined length having a predetermined transmission time.

65. The apparatus of claim 64, wherein said predetermined transmission time is equal to an integer multiple of the inverse of twice the frequency of said analog signal.

66. The apparatus of claim 63, wherein said delay circuit comprises a memory which receives said analog waveform and outputs said associated delayed analog signal after said respective predetermined delay time interval has passed.

67. The apparatus of claim 66, wherein said respective delay time interval is equal to a respective integer multiple of the inverse of twice the frequency of said analog signal.

68. The apparatus of claim 63, wherein the number of delay paths and the associated weighting for each delay path are determined by an iterative process to achieve a balance between a narrowest range in a plurality of measured values of said compensated analog waveform indicative of a particular coding level and a greatest minimum distance between adjacent coding levels.

69. The apparatus of claim 57, wherein said weighted delayed analog signals are determined, and said compensated analog waveform is formed prior to transmission over said transmission system.

70. The apparatus of claim 57, wherein said weighted delayed analog signals are determined, and said compensated analog waveform is generated, after receipt of said analog waveform transmitted to said apparatus.

71. The apparatus of claim 70, further comprising a digital signal processor real-time computational apparatus for generating said compensated analog waveform.

72. The apparatus of claim 57, further comprising a digital signal processor real-time computational apparatus for generating said compensated analog waveform.

* * * * *